May 24, 1960 Q. P. COLE 2,938,122
ELECTRON RADIATION METER
Filed Sept. 24, 1957
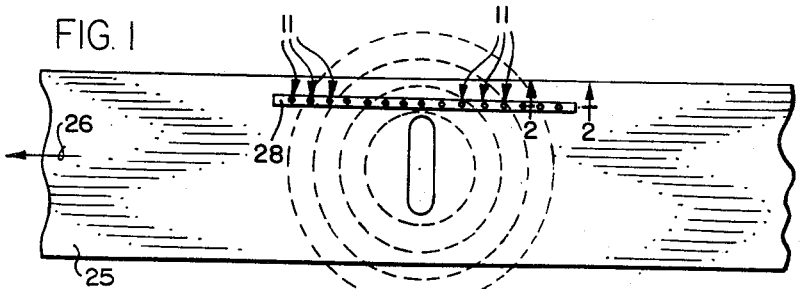
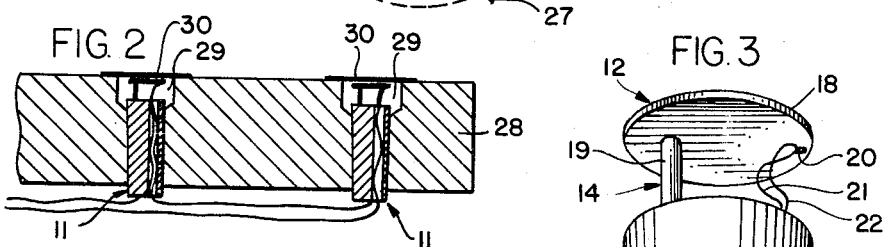
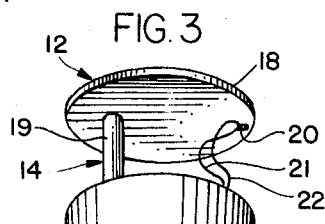
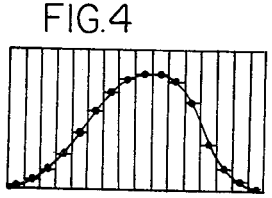
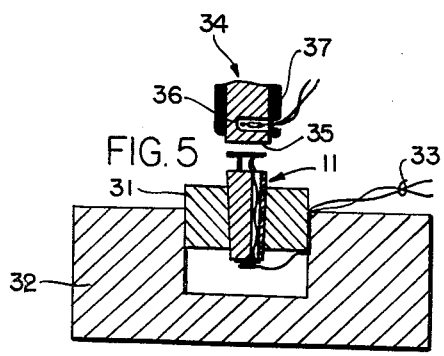
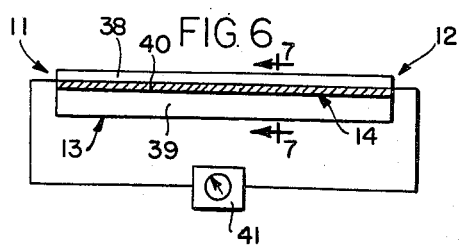
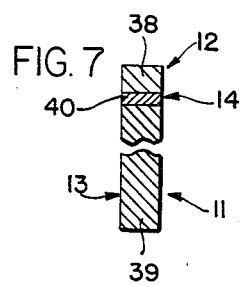
INVENTOR:—
QUINTIN P. COLE
BY:—
*Junius F. Cook, Jr.*
ATTORNEY

United States Patent Office 2,938,122
Patented May 24, 1960

2,938,122
ELECTRON RADIATION METER
Quintin P. Cole, Pittsfield, Mass., assignor to General Electric Company, a corporation of New York Filed Sept. 24, 1957, Ser. No. 685,854

10 Claims. (Cl. 250—83.3)

The present invention relates in general to electronic radiation, and has more particular reference to electron radiation metering means.

An important object of the present invention is to provide a relatively simple and inexpensive electron responsive meter structure for measuring the intensity of electron radiation rapidly and accurately.

Another important object of the invention is to provide a meter structure of the character mentioned for determining the intensity of electron radiation in terms of heat generated by electron impact upon a target portion of the structure.

Another important object of the invention is to provide an electron radiation meter having sufficiently rapid response characteristics to permit a battery or series of spaced apart and aligned metering units to be moved transversely through an electron beam in order to measure radiation intensity across the beam in direction normal to the row of aligned units.

Another important object is to provide an electron radiation meter embodying a target, as of metal, capable of producing a large amount of heat therein in response to high velocity electron impingement upon the target; a further object being to measure the heat thus generated in such target by connecting the same through means forming a relatively inefficient heat conducting path to a heat sink comprising a body of material having a large heat receiving capacity whereby, when the target is disposed in a beam of accelerated electrons to be metered, the temperature of the target may rise until a condition of dynamic equilibrium is reached at which the rate of heat produced in the target as the result of electron impingement thereon becomes equal to the rate of heat delivery from the target to the heat sink through the conducting path, the temperature differential between target and sink being a measure of the intensity of target impinging electron radiation, such intensity being measurable in the form of E.M.F. produced by a thermo-couple having a junction connected at the target and a reverse junction connected on the heat sink.

Another important object is to provide means for shifting a spaced apart, aligned series of metering or sensing units of the character mentioned transversely across an electron beam in a direction normal to the line of units, in order to scan the entire radiation field rapidly, the E.M.F. produced by the thermo-couples of the several units being applied upon a suitable recording volt meter to produce a trace representing a calibration of the radiation field in the plane of scanning movement of the sensing units therethrough; a further object being to connect the thermo-couples in series in order to obtain a volume average line integration of electron intensity varying with the position of the line of sensing units in the scanning plane, such a trace being obtainable in a relatively short space of time of the order of a few minutes, as compared with the many hours hitherto required in obtaining a calibration of the sort mentioned through employment of ion chamber means for electron sensing purposes.

Another important object is to provide a meter of the character mentioned embodying an electronic target comprising a gold disc set upon a stem of iridium-platinum alloy, the stem being adjustably mounted in a copper block, as a heat sink, the operating characteristics of such sensing unit being adjustable or variable in response to change in the dimensions of the target stem and heat sink forming elements, as well as by the spacement of the target disc with respect to the heat sink element.

Still another important object is to provide a linear sensing unit for measuring the intensity of electron radiation comprising an elongated sandwich embodying a strip of electron target material and a block of material forming a heat sink, said strip and block being separated by a layer of heat sensitive semi-conducting material, such as thermistor material, electron intensity being integrated and measured along and in the direction of the linear sensing unit in terms of the resistance of the thermistor layer.

The foregoing and numerous other important objects, advantages, inherent functions, and utilities of the invention will become apparent as the same is more fully understood from the following description which, taken in conjunction with the accompanying drawings, discloses preferred structural embodiments selected for the purpose of demonstrating the invention.

Referring to the drawings:

Fig. 1 is a diagrammatic view showing a spaced apart, aligned series of electron sensing units disposed in position to scan an electron beam of the sort commonly employed for the irradiation objects;

Fig. 2 is an enlarged sectional view taken substantially along line 2—2 in Fig. 1 to illustrate structural details;

Fig. 3 is an enlarged perspective view of a sensing unit embodying the present invention;

Fig. 4 is a graphical representation of a radiation intensity curve of the sort that can be ascertained by means of the device shown in Fig. 1;

Fig. 5 is a diagrammatic showing of an assembly of equipment that may be employed in calibrating and adjusting a sensing unit of the sort shown in Fig. 3;

Fig. 6 is a diagrammatic partial, sectional view taken longitudinally of a linear sensing unit of modified form and embodying the teachings of the present invention; and Fig. 7 is a sectional view taken substantially along the lines 7—7 in Fig. 6.

To illustrate the invention, the drawings show electron radiation intensity sensing devices 11 embodying electron target means 12, means forming a preferably metal heat sink 13, and relatively inefficient heat transfer means 14 extending between and supporting the target means 12 and the heat sink 13 in spaced apart relationship, the sensing device being cooperatively associated with means for measuring the temperature differential between the target and the heat sink.

The principle upon which the metering apparatus of the present invention functions contemplates the application of high velocity electrons upon the metallic target means in order to generate a large amount of heat therein, which heat may be dissipated through the heat conducting means to the heat sink which comprises a body of material having relatively large and substantially unlimited heat absorbing capacity. As a consequence of electron impingement upon the target means, its temperature will rise until a condition of dynamic equilibrium is reached at which the rate of heat developed in the target as the result of electron impingement thereon is equal to the rate at which heat is delivered from the target means to the heat sink, the temperature differential between the target means and the heat sink, under such conditions, being a measure of the intensity of electron radiation applied to the target means.

As shown more particularly in Fig. 3 of the drawings, each sensing device 11 may embody a heat sink or reservoir 13 comprising a body 15 of material having high heat conductivity to minimize temperature differentials within the heat sink or reservoir. The body 15 also has high heat receiving capacity to minimize rise in temperature of the heat sink in response to the delivery of heat therein. To these ends, the body 15 may conveniently comprise a copper block, preferably formed as a tapering pin of the order of one inch in length and a half inch in diameter. The pin forming the body 15 may be provided with a pair of parallel, spaced apart ducts or channels 16 and 17 extending longitudinally through and opening at the opposite ends of the pin.

Each sensing device 11 also embodies an electron target element 12 comprising a disc 18 of material thick enough to absorb electrons applied at an intensity of one mev., to thereby provide for the measurement of total applied radiation instead of surface intensity only. The disc 18 should also have relatively low heat storing capacity in the interests of rapid response characteristics in the sensing unit, and the disc should comprise material having high heat conductivity, to thereby minimize temperature differentials within and throughout the target disc. To these ends, the disc preferably comprises gold, which has relatively low heat containing capacity and relatively high heat conductivity, the target 12 preferably comprising a disc having thickness of the order of five one-thousandths of an inch and diameter of the order of one-quarter of an inch.

The target disc 18 is supported on the heat sink forming body 15 in spaced apart relation with respect to an end thereof by the heat transfer means 14, preferably comprising a rod 19 of material having relatively low heat containing capacity, in the interests of rapid response characteristics in the sensing unit, the rod also having lowest possible heat conductivity in order to obtain a maximum temperature differential between the target means 12 and the heat sink 13. To these ends, the rod 19 may comprise the alloy of platinum and iridium in proportions of the order of nine to one, the rod having diameter of the order of three one-hundredths of an inch, the same being sized for an adjustable drive fit within the duct 17 so that the end of the rod which projects outwardly of one end of the body 15 may have an adjustable length of the order of one-tenth of an inch. The disc 18 may be secured to and integrated with the terminal end portions of the rod 19, as by means of silver solder.

Temperature differences prevailing from time to time between the target disc 18 and the heat sink forming body 15 may be measured in any suitable or preferred fashion, as by means of a thermocouple 20, which may conveniently comprise the interconnected ends of a copper wire 21 and a wire 22 comprising the alloy of copper and nickel, hereinafter referred to as "copnic." The thermocouple 20 may be secured preferably upon the under or heat sink facing side of the disc 18, as by means of epoxy cement, or other suitable couple mounting means. The wires 21 and 22, except where interconnected to form the couple 20, are preferably provided with an insulating coating, as of lacquer, and extend from the disc 18 through the duct 16 to the disc remote end of the heat sink body 15.

The couple remote ends of the wires 21 and 22 are electrically connected respectively with copper terminals 23 and 24, which are secured upon the target remote end of the body 15 in heat exchange relation thereto, and in fashion electrically insulating the terminals 23 and 24 from said body. The connection of the copnic wire 22 with its connected copper terminal 24 provides a reference junction at said connected terminal in heat exchange relation with respect to the heat sink. Accordingly, by electrically connecting the terminals 23 and 24 in any suitable or preferred fashion with an appropriate indicating or recording potentiometer, the temperature differential between the target disc and the heat sink, as measured at the couple 20 and the junction of the wire 22 with the terminal 24, may be accurately determined.

When a unit of the sort shown in Fig. 3 is mounted in position to dispose the gold disc 18 in an electron beam, a portion of the radiation impinging on the disc will be converted to heat, thereby increasing the temperature of the disc until the rate of heat loss through the rod 19 to the heat sink equals the rate at which heat is developed in the disc in response to electron impingement thereon. The difference in temperature between the copper block 15 and the disc 18 is proportional to the radiation energy applied to the disc and also to the electromotive force produced by the thermocouple 20 and its reference junction at the terminal 24.

Electron beam intensity sensing units of the sort shown in Fig. 3 may be usefully employed in calibrating the electron beams emitted by and from electron generating tubes of the sort used in irradiating various objects, including manufactured products such as polyethylene film. In the commercial irradation of polyethylene film, with high speed electrons, the web to be irradiated is caused to move transversely through the beam along a plane perpendicular to the axis of the beam, which is more or less a collimated beam. The film, in effect, forms a multilayer web that is thick enough to stop the fastest electrons in the beam. During a single pass of the web being irradiated through the irradiating beam, any specific point in the film is irradiated to an extent which may be determined by integrating the radiation intensity of the beam along the path of movement of such point through the beam. Accordingly, an ion chamber moved along such path will indicate the surface intensity of the radiation as a measure of the "volume average" of irradiation intensity, where uniformity of dose with depth can be assumed.

When investigating the intensity of the field as applied to an underlying layer of the web having one or more electron absorbing layers of film extending thereover, an ion chamber employed to examine irradiation intensity should necessarily be shielded with a corresponding blanket of polyethylene to produce the line integrated intensity of radiation available to such underlying film of a web. The total irradiation applied at a particular spot in a layer of a web will, of course, be the sum of the line integrated intensities for all passes made by the film. Although these intensities are "surface" values when determined experimentally, they become "volume average" values when applied to the mass of polyethylene underlying each increment of surface area, and which may be assumed to be irradiated to the same degree as the surface.

Calibration of the electron radiation field of an electron beam generator by employing the above described ion chamber technique requires many passes of the ion chamber along each of a number of lines or paths in each transverse plane in which a calibration of the beam is desired, and many hours are required to obtain calibration data in a single plane, with many additional hours for evaluating the resulting data.

The present invention provides an infinitely faster means for measuring electron radiation intensities, especially in the form of volume average line integrated dosage. In order to obtain direct measurement of the volume average line integrated dose which will be acquired by polyethylene film 25, while passing in the direction indicated by the arrow 26 through a collimated electron irradiation field 27 of the sort indicated in dotted lines in Fig. 1, a plurality of sensing units 11, of the sort shown in Fig. 3, may be mounted preferably in equally spaced apart alinement in a support bar 28, the distance between the sensing units being preferably of the order of two inches or less, and a sufficient number of units being mounted on the bar 28 to accommodate the size of the irradiation field to be calibrated. The bar 28 preferably comprises copper and hence may itself act as a heat sink.

As shown more especially in Fig. 2 of the drawings, the tapered bodies 15 of the units 11 may be received in correspondingly tapered bores formed in the bar 28 in precisely spaced alinement, the bar being counterbored, as at 29, to afford clearance for the upper portions of the units. The gold target disc 18 of each unit 11 is preferably disposed slightly below the level of the upper surface of the bar 28, and a window pane 30, of aluminum foil having thickness of the order of five ten-thousandths of an inch, may be applied in position overlying each of the target discs in the counterbores 29 to protect the same against the influence of ambient air currents.

The thermocouples of the sensing units supported on the bar 28 are then electrically interconnected in series, so that the total electromotive force produced by all of the units on the bar 28 will measure the total radiation striking all of said units, and hence will be substantially proportional to the radiation applied to that portion of a film 25 which traverses the beam 27 along the line defined by the bar mounted sensing units 11, as shown in Fig. 4. For any selected position of the line of sensing units in the radiation field, the sum of the electromotive forces developed by the thermocouples of the units will indicate by its magnitude the dose that will be applied in that portion of the film which traverses the radiation beam along the same line.

To obtain a complete calibration of the radiation field provided by a given electron beam, in one tranverse plane, the line of sensing units on the supporting bar 28 may be mounted in any suitable or preferred manner upon a motor driven support structure guided to cause the bar 28 to move transversely of the beam 27 in a direction normal to the bar and to the direction of movement of the web 25 through the beam. The electromotive force generated by the sensing units in such an arrangement may be fed to a recording volt meter in order to produce a graph or trace showing the manner in which the electromotive force, and consequently the electron irradiation intensity, changes with the changing position of the line of sensing units in the radiation field.

It will be seen from the foregoing that a device embodying the present invention may be employed to obtain a complete calibration of electron intensity at any spot in an electron beam 27, and that calibration in terms of volume average line integrated dosage may likewise be obtained through the beam at any desired plane, as rapidly as a line of sensing units, supported on a bar 28, may be passed through the beam. Radiation meters of the sort herein described are capable of measuring the volume average line integrated dose of an entire radiation field within a few minutes for each calibration plane, as compared with the many hours required in determining the intensity characteristics of an electron beam by ion chamber techniques of the sort heretofore employed.

In order that all sensing units employed in an arrangement such as is shown in Fig. 1 will show identical response characteristics to electron radiation, each unit may be individually calibrated, as shown more especially in Fig. 5, by placing it in a central opening formed in a preferably copper block 31 which may have square configuration, said copper block being in turn mounted in a support block 32 of material such as wood. The thermocouple leads 33 may be connected with a precision potentiometer. Any suitable or preferred means may be provided for mounting a standard heat source 34 at a precisely selected distance, of the order of one-tenth of an inch, from the target disc 18 of the so mounted sensing unit.

The heat source 34 may conveniently comprise an electrical soldering iron faced off flat at its head, as shown at 35, a small thermocouple well 36 being drilled in the side of the iron immediately behind the flat face of the head. The head may be ensheathed with a layer 37 of heat insulating material, such as by wrapping the same with asbestos string and finally encasing the string within a layer of sheet aluminum. The temperature of the heater 34 may be controlled by a powerstat and measured with a standard potentiometer connected with a thermocouple disposed in the well 36. The gap between the target disc of the sensing unit being calibrated and the facing surface 35 of the heat source should be precisely adjusted, as by means of a feeler gauge, and the calibration assembly should also be shielded to reduce the effect of vagrant air currents upon the calibration. The rod 19 of each sensing unit is adjusted in its mounting hole to alter the spacement between the disc 18 and the facing end of the body 15 until the response of the sensing unit conforms with a selected value.

A modified form of sensing unit embodying the present invention is illustrated in Figs. 6 and 7. Such unit, comprising a sandwich embodying a strip of target material 38, such as aluminum, is employed as the target means 12, said strip being separated from a bar of copper 39 forming a heat sink, by means of an intervening layer of thermistor material 40 forming relatively inefficient heat transfer means. Since the thermistor is in heat exchange relation with respect to the target strip 38, its temperature, and therefore its resistance, will vary in accordance with the temperature to which the target strip is raised as the result of electron impingement thereon. The resistance of the thermistor may be determined by connecting the same with a precision ohm meter 41. As a consequence, if the sandwich is of relatively narrow, elongated configuration extending entirely across the radiation field in place of the unit carrying bar 28 in Fig. 1, a measurement of the resistance of the thermistor layer 40 will be proportional to the volume average line integrated dose.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. An electron radiation intensity meter comprising target means wherein heat is generated upon the subjection of said target means to radiation, a member having a relatively large heat capacity, an element having relatively poor heat conduction properties connecting said target means to said member, a thermocouple having a temperature responsive junction which is heated in accordance with the intensity of the radiation impinging upon said target means and a reference junction which is substantially maintained at the temperature of said member whereby the difference in temperatures between said junctions is a function of the intensity of said radiation.

2. An electron radiation intensity meter comprising target means comprising a gold disc wherein heat is generated upon the subjection of said target means to electron irradiation, a member having a relatively large heat capacity, an element having relatively poor heat conduction properties connecting said target means and said member, a thermocouple having a temperature responsive junction which is heated in accordance with the intensity of the radiation impinging upon said target means and a reference junction which is substantially maintained at the temperature of said member, and means connected between said junctions for indicating the temperature differences therebetween whereby such difference is a function of the intensity of said radiation.

3. An electron radiation intensity meter as defined in claim 2 wherein said member comprises copper.

4. An electron radiation intensity meter as defined in claim 3 wherein said element comprises an alloy of platinum and iridium.

5. An electron radiation intensity meter for indicating the volume average line integrated value of a given electron radiation field comprising a plurality of target means arranged in a spaced linear array, heat being generated in each of said target means upon the subjection thereof to electron irradiation, a plurality of members, each of said members having a relatively large heat capacity, a plurality of elements each of said elements having relatively poor heat conduction properties, each of said members connecting one of said target means and one of said members, a thermocouple associated with each arrangement comprising a target means and a member connected by an element, each of said thermocouples having a temperature responsive junction which is heated in accordance with the intensity of the electron radiation impinging upon the target means with which it is associated and a reference junction which is maintained substantially at the temperature of the member with which it is associated, the difference between said respective junctions being a function of the intensity of the electron radiation impinging upon a corresponding target means and means for electrically connecting said thermocouples in series relationship whereby the total voltage obtained thereby is proportional to the sum of the voltages of the discreet thermocouples and whereby said total voltage is a function of the intensity of the electron radiation along the line of said linear array.

6. An electron radiation intensity meter as defined in claim 5 wherein said target means respectively consist of gold discs.

7. An electron radiation intensity meter as defined in claim 6 wherein said respective members comprise copper.

8. An electron radiation intensity meter as defined in claim 7 wherein said elements respectively comprise an alloy of platinum and iridium.

9. An electron radiation intensity meter comprising a first layer of a material having a relatively large heat capacity, a second layer on said first layer of a material having relatively poor heat transfer properties, and whose electrical resistance characteristics vary in accordance with its temperature, a third layer on said second layer comprising a material wherein heat is generated upon the irradiation thereof with electrons, whereby upon the irradiation of said third layer with electrons, the change in resistance in said second layer is a function of the intensity of said radiation.

10. An electron radiation intensity meter as defined in claim 9 wherein said third layer comprises aluminum, said second layer comprises a thermistor material and said first layer comprises copper.

References Cited in the file of this patent
UNITED STATES PATENTS

| | | |
|---|---|---|
| 2,054,120 | Florez | Sept. 15, 1936 |
| 2,516,873 | Havens et al. | Aug. 1, 1950 |
| 2,768,527 | Stern et al. | Oct. 30, 1956 |